United States Patent [19]

Benesh

[11] Patent Number: 4,830,570
[45] Date of Patent: May 16, 1989

[54] WIND TURBINE SYSTEM USING TWIN SAVONIUS-TYPE ROTORS

[76] Inventor: Alvin H. Benesh, 120 S. Adams Ave., Pierre, S. Dak. 57501

[21] Appl. No.: 132,990

[22] Filed: Dec. 15, 1987

[51] Int. Cl.$^4$ .............................. F03D 3/02; F03D 3/04
[52] U.S. Cl. ................................ 415/4.4; 416/DIG. 9; 416/121; 416/197 A
[58] Field of Search ................................ 415/2 R-4 R, 415/DIG. 1 A; 416/DIG. 9, 121 A, 122 A, 197 A

[56] References Cited

U.S. PATENT DOCUMENTS

| | | | |
|---|---|---|---|
| 59,828 | 11/1866 | Fay | 416/170 A X |
| 274,541 | 3/1883 | Zweibel . | |
| 410,360 | 9/1889 | Ham | 415/2 R |
| 434,108 | 8/1890 | Gatlin . | |
| 607,608 | 7/1889 | Tinsley . | |
| 764,571 | 7/1904 | Fisher . | |
| 923,698 | 6/1909 | Perry . | |
| 973,823 | 10/1910 | Stamm . | |
| 1,166,765 | 6/1930 | Savonius | 416/197 A |
| 1,300,499 | 5/1919 | Slagel . | |
| 1,413,411 | 4/1922 | Lloyd et al. | 415/2 R X |
| 1,455,950 | 5/1923 | Willman . | |
| 1,534,799 | 4/1925 | Maine . | |
| 1,596,373 | 8/1926 | Preston . | |
| 1,790,175 | 1/1931 | Spencer | 415/2 R |
| 2,007,963 | 7/1935 | Cleveland | 416/197 A |
| 3,895,882 | 7/1975 | Moyer | 415/2 R |
| 4,005,947 | 2/1977 | Norton et al. | 416/DIG. 9 X |
| 4,037,983 | 7/1977 | Poeta | 416/122 A X |
| 4,039,849 | 8/1977 | Mater et al. | 290/55 |
| 4,111,594 | 9/1978 | Sforza | 415/2 A X |
| 4,115,028 | 9/1978 | Hintze | 415/2 R |
| 4,156,580 | 5/1979 | Pohl | 416/122 A X |
| 4,204,795 | 5/1980 | Forrest | 415/2 R |
| 4,278,896 | 7/1981 | McFarland | 290/55 |
| 4,288,200 | 9/1981 | O'Hare | 415/2 R |
| 4,315,713 | 2/1982 | Verplanke | 415/2 R |
| 4,359,311 | 11/1982 | Benesh | 416/197 A |
| 4,362,470 | 12/1982 | Lo Castro et al. | 416/197 A |
| 4,428,711 | 1/1984 | Archer | 415/2 A |
| 4,449,887 | 5/1984 | Mundhenke | 415/4 |
| 4,474,529 | 10/1984 | Kinsey | 415/2 R |
| 4,652,206 | 3/1987 | Yeoman | 415/4 |
| 4,715,776 | 12/1987 | Benesh | 415/2 R |

FOREIGN PATENT DOCUMENTS

| | | | |
|---|---|---|---|
| 1123341 | 5/1981 | Canada | 416/197 A |
| 37015 | 1/1927 | Denmark | 416/197 A |
| 25023 | 3/1981 | European Pat. Off. | 415/2 R |
| 453231 | 12/1927 | Fed. Rep. of Germany | 416/122 A |
| 821930 | 10/1951 | Fed. Rep. of Germany | 416/197 A |
| 1628140 | 4/1970 | Fed. Rep. of Germany | 416/197 A |
| 1916460 | 10/1970 | Fed. Rep. of Germany | 416/197 A |
| 2758447 | 7/1979 | Fed. Rep. of Germany | 415/2 R |
| 2819673 | 11/1979 | Fed. Rep. of Germany | 416/122 A |
| 658943 | 6/1929 | France | 416/197 A |
| 727519 | 6/1932 | France | 416/197 A |
| 797106 | 4/1936 | France | 416/197 A |
| 1048392 | 12/1953 | France | 415/2 R |
| 2286955 | 4/1976 | France | 415/4 R |
| 2431041 | 3/1980 | France | 415/2 R |
| 2468003 | 5/1981 | France | 416/197 A |
| 2522074 | 8/1983 | France | 415/2 R |
| 138466 | 10/1981 | Japan | 415/2 R |
| 145464 | 7/1985 | Japan | 416/197 A |
| 65940 | 12/1924 | Sweden | 416/197 A |
| 258955 | 10/1926 | United Kingdom | 415/2 R |

OTHER PUBLICATIONS

Chang, Howard H. and McCracken, Horace, "Bucket Rotor Wind-Driven Generator", from *Wind Energy Conversion Systems*, p. 27.

(List continued on next page.)

*Primary Examiner*—Everette A. Powell, Jr.
*Attorney, Agent, or Firm*—Merchant, Gould, Smith, Edell, Welter & Schmidt

[57] ABSTRACT

The present invention relates to a combination of two vertical axis Savonius-type rotors (20,120) mounted on a support structure (210) and a deflector plate (200). The deflector plate serves as an augmentation apparatus which considerably increases the power output of both Savonius-type-rotors and also improves their self-starting ability and smoothness of operation. The support structure is mounted for rotation about a central vertical shaft (242) so that the rotor-deflector combination can be properly positioned. The invention also provides a partition plate (236) positioned between the rotors to give rigidity to the deflector plate.

23 Claims, 6 Drawing Sheets

OTHER PUBLICATIONS

Golding, E. W., "The Generation of Electricity by Wind Power", E. & F. N. Spon, Ltd., London 1955, distributed in USA by Halsted Press, a division of John Wiley & Sones, Inc, New York.

Park, Jack, "Wind Machine Design", from *The Wind Power Book*, Cheshire Books 1981.

Hackelman, Michael, "The Savonius Super Rotor", reprinted from the *Mother Earth News*, No. 183.

Newsletter One, A Supplement to Wind and Windspinners, Jul. 1975.

Savonius, S. J., "The S-Rotor and Its Applications", reprinted from *Mechanical Engineering*, May 1931, vol. 53, No. 5.

Vance, W., "Vertical Axis Wind Rotors–Status and Potential", from *Wind Energy Conversion Systems*, pp. 28–30.

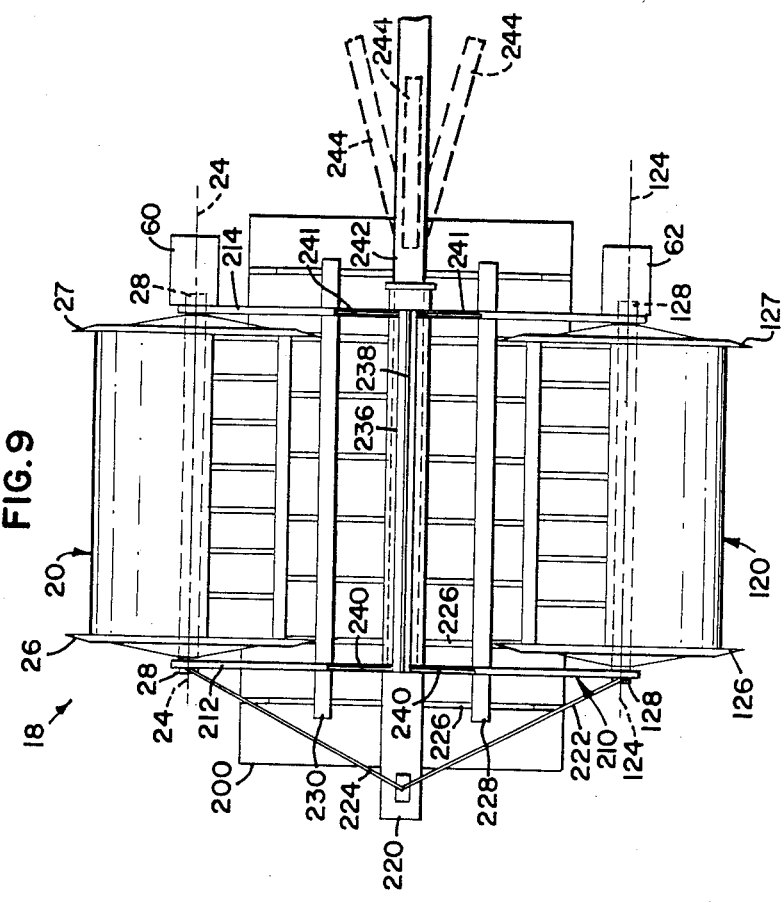
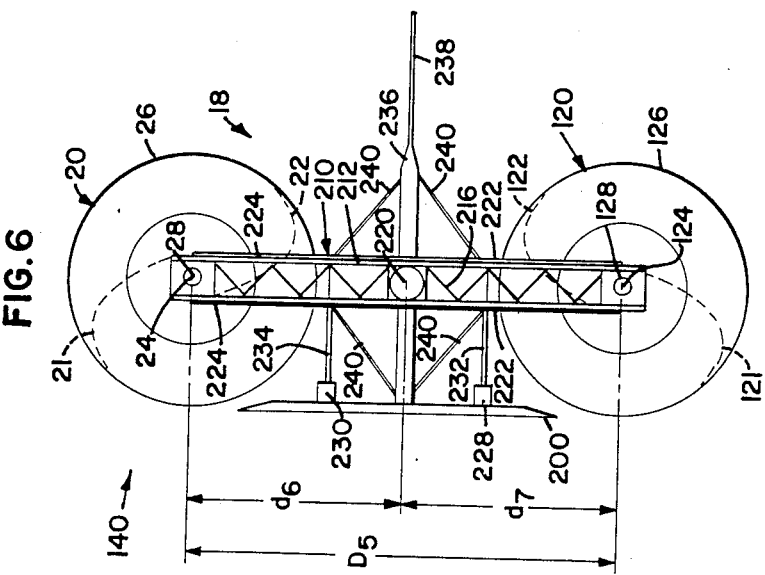

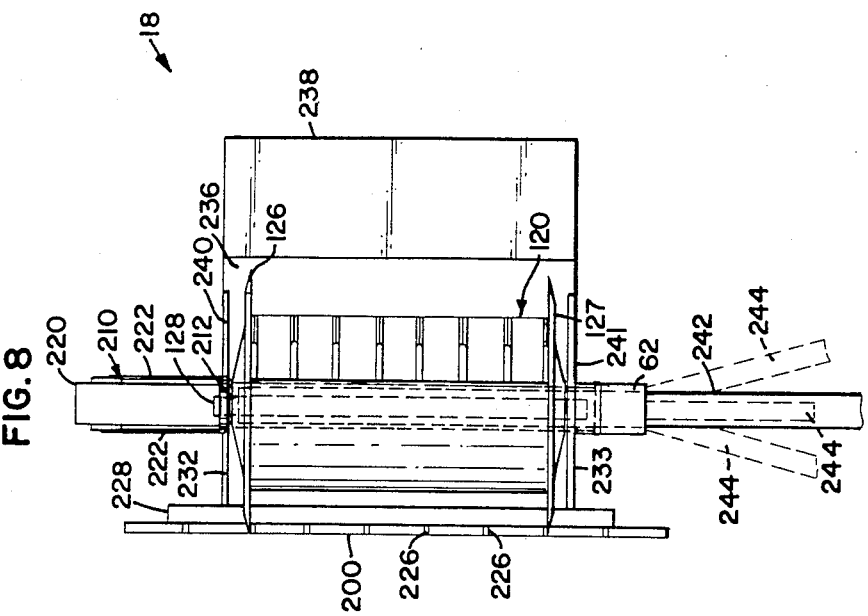
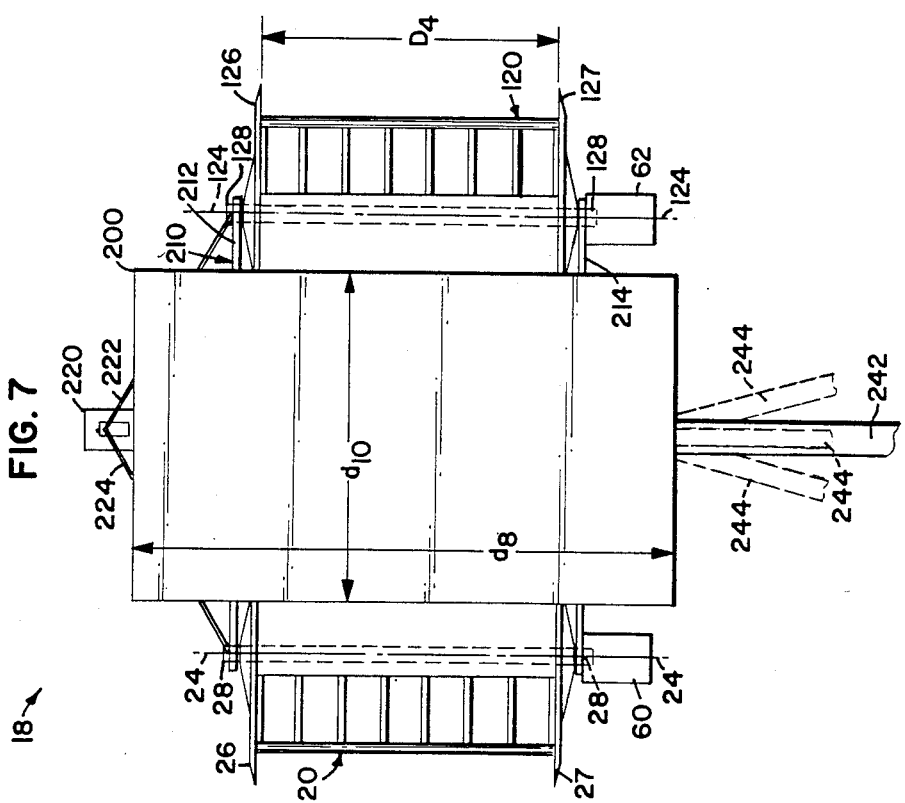

WIND TURBINE SYSTEM USING TWIN SAVONIUS-TYPE ROTORS

BACKGROUND OF THE INVENTION

The present invention relates to the combination of two vertical axis Savonius-type rotors and one deflector plate device which serves as an augmentation apparatus for both of the rotors. The deflector plate device considerably increases the power output of both Savonius-type rotors and also improves their self-starting ability and smoothness of operation.

As used in this application, the term "Savonius-type rotor" includes rotors having a shape as generally illustrated in this application, in applicant's patent application Ser. No. 069,405 and in applicant's U.S. Pat. Nos. 4,715,776 and 4,359,311, as well as rotors with two or more blades of the classic Savonius-type, wherein the rotor blades are generally semi-cylindrical in shape. This is in contrast to turbines which have the inner edges of the blades fixed to adjoining blades or to a central core, drum or shaft in such a manner that there can be practically no crossing of the fluid past the inner edges of the blades.

High speed propeller-type turbines have dominated the wind energy field largely because of their relatively high efficiency. Slow speed turbines such as the Savonius vertical axis turbine or the multi-blade horizontal axis windmill used for pumping water have typically been of low efficiency and cannot compete with the high speed propeller type turbines for electrical power production. In addition to other disadvantages, however, there are some places where the high speed propeller-type turbine cannot be installed. For example, such a turbine cannot be placed on top of large area flat buildings because the wind would be too unstable, and also the turbines would be too dangerous. Also, with the high speed turbines, safety is a important consideration, and since metal fatigue is related to the number of stress reverses of high magnitude, it is difficult to predict when a blade may come loose from the turbine.

As indicated in applicant's U.S. Pat. Nos. 4,715,776 and 4,359,311, Savonius-type rotors have well-known problems associated therewith. For example, they have low starting torque when oriented at certain directions and their action is jerky and pulsating under a load.

The Savonius-type rotors disclosed in applicant's U.S. Pat. No. 4,7815,776 and U.S. patent application Ser. No. 069,405 offer many advantages over the prior art rotors in that they exhibit considerably improved efficiency, and considerably better self-starting characteristics. These applications also disclose a deflector plate in combination with the rotor which additionally increases the power output of the rotor assembly. The present invention offers even further advantages over existing Savonius-type rotor assemblies.

The present invention provides the combination of two vertical axis Savonius-type rotors and one deflector plate which serves as an augmentation apparatus for both of the Savonius-type rotors. The two Savonius-type rotors of the present invention can be built much larger than the rotor disclosed in applicant's U.S. application Ser. No. 069,405 because the rotors are mounted on a strong central support structure. The use of two vertical axis Savonius-type rotors along with one deflector plate that augments both of the rotors yields a system that has greater efficiency than any high-speed propeller-type turbine, and rivals the intermediate and small sizes in terms of power production. In addition, the present invention is balanced in yaw so that only a minor torque is necessary to keep the rotors oriented properly with respect to the wind. The two blade Savonius-type rotor used in the present invention is set out in applicant's U.S. Pat. No. 4,715,776 U.S. patent application Ser. No. 069,405, both of which are herein incorporated by reference.

SUMMARY OF THE INVENTION

The present invention provides for two vertical axis Savonius-type rotors having at least two blades and being mounted on a support framework. The two rotors are mounted on the support framework so that they are at substantially the same horizontal level. The present invention also provides for a deflector member extending along the heights of the two rotors and positioned on the side of the rotors facing the direction from which the wind is flowing.

A particularly advantageous feature of the present invention is the provision for two vertical axis Savoniustype rotors of increased efficiency in combination with one simple, inexpensive augmentation device which increases the output of both rotors significantly. The augmentation device placed between the rotors directs wind into both rotors. In this way, wind energy is not wasted on either side of the augmentation device.

While the augmented Savonius-type rotor still has some economic disadvantage of requiring a large amount of material, the construction thereof is of relatively low technology, and the augmented rotor's high efficiency goes far toward overcoming this deficiency.

The present invention is also advantageous in that it exhibits greater reliability than propeller-type devices and, in consequence, will have a much longer service life. It is intended that with the preferred embodiment, generally the only attention that will be required in the present invention is occasional lubrication of anti-friction bearings. Maintenance will be low due to relatively few moving parts. The occasional maintenance that the gear boxes and alternators of the present invention will require can be conveniently performed because the gear boxes and alternators are installed below the rotors. Therefore, servicemen do not need to climb a ladder to the rotor center for maintenance. As this part of the rotor is relatively close to the ground, servicemen can work on it from ground equipment with a support which can be easily raised to the proper level. Accordingly, the costs of the present invention over its lifetime will be substantially reduced.

The present invention provides for an improved design for a Savonius-type rotor which is significantly more efficient than the usual type of existing two-blade Savoniustype rotor. This design is set out in applicant's U.S. Pat. No. 4,715,776 and U.S. patent application Ser. No. 069,405. The rotor blade surface of this Savonius-type rotor average a much closer distance to an imaginary plane passing through the rotor axis and the edges of the rotor blades at the rotor tips than previous designs.

Another advantage of the present invention is that the central support structure can be made large and strong without interfering with the action of the two rotors. Also, the gear boxes and alternators can be installed below the rotor with power in direct line from the rotor shaft since the support structure is not directly below the rotors, but rather in between them.

A further advantage of the central support structure is that each rotor shaft can be supported at both ends rather than at one end only. When the rotor shaft is supported at both ends, it sustains only one quarter of the bending moment and has less than one-ninth of the deflection of a rotor supported only at one end. Therefore, it can be seen that supporting the rotor shaft at both ends produces a pronounced structural advantage which can be translated into relative cost and operating efficiency. Also, when the rotor shaft is supported at both ends, a rotor with a greater length in relation to its diameter is feasible.

In the preferred embodiment, a deflector plate is placed on the windward side of the two Savonius-type rotors so as to act as an augmentation device wherein the action of the Savonius-type rotors becomes quite smooth and starting is made possible at nearly a full load with the wind from any direction relative to the orientation of the blades of the rotors. The two-blade Savoniss-type rotors used in the present invention are particularly adapted to augmentation by the deflector plate of the preferred embodiment, so as to enable improvement in its performance characteristics.

The augmentation device includes a deflector plate which is positioned on the side of the two rotors from which the wind is blowing. The deflector plate extends substantially along the heights of the two rotors. The placement of the deflector plate with respect to the two rotors is critical. In the preferred embodiment, the deflector plate is positioned between a first plane extending through the vertical axis of the first rotor substantially perpendicular to a line drawn through the vertical axes of the first and second rotors and a plane drawn through the vertical axis of the second rotor substantially perpendicular to the line drawn through the vertical axes of the first and second rotors. In the preferred embodiment, the deflector plate is centered between these planes and has a length less than the horizontal distance between the vertical axes of the first and second rotors. With any variation from the optimum position, the efficiency of the rotors falls off rapidly.

Additionally, the applicant has discovered that the vertical height of the deflector with respect to the rotors makes a considerable difference. If the deflector height is no greater than the height of the rotors, a significant portion of the wind spills past the top and bottom and does not go through the rotor. In the preferred embodiment, the deflector plate is extended a distance of one-half the rotor diameter on each end of each rotor. Also, in the preferred embodiment, the deflector member is a substantially vertical flat plate.

In an alternative embodiment of the present invention, the deflector member is a substantially vertical plate which is curved on both ends and straight in the middle with the curve on each end defining a surface generally concave with respect to the first and second vertically extending axes. Accordingly, the augmentation device of the preferred embodiment and the alternative embodiment exhibit extreme simplicity, ease of construction, conservation of materials, low costs, relatively slight space requirements for operation, and ease of adjustment.

In the preferred embodiment of the present invention, a partition is provided between the two rotors to prevent fluid leaving each rotor from reacting with the other rotor and creating turbulence with a possible reduction in efficiency. The partition extends substantially along the heights of the first and second rotors and the length of the partition is substantially perpendicular to a line drawn through the vertical axis of the first rotor and the vertical axis of the second rotor.

In the preferred embodiment of the present invention, as mentioned before, the support framework which the rotors are mounted on rotates about a central vertical shaft so that the rotors and deflector plate can be oriented in the correct position relative to the wind. Control of the rotation or, orientation in yaw, might be accomplished by electrical controls activated by a nearby weather vane or the like.

Another advantage of the preferred embodiment of the present invention is that the system is balanced in yaw. Because the deflector plate is centered with respect to the two rotors, the wind acting on the deflector plate and the two rotors is balanced in yaw so that the yaw control mechanism for the two rotors need exert only a minor torque, if any at all, to keep the rotors properly oriented in the wind.

Another advantage of the central vertical shaft is that the rotor assembly is constantly oriented at the correct position relative to the wind without the need for wheels on the bottom of the support structure for traveling along a track. Thus, the present invention saves space.

In yet other embodiments, a central shaft about which the support structure rotates or pivots in yaw might be located in front of the rotor, and configured such that the orientation in yaw in controlled solely by the wind force. It is possible that in this embodiment, a set of wheels for additional support may be necessary, operating on a track on the ground with a short radius from the vertical shaft to the track.

These and various other advantages and features of novelty which characterize the present invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals and letters indicate corresponding parts throughout the several views.

FIG. 6 is a top plan view of an embodiment of a system including two vertical Savonius-type rotors similar to that of FIG. 1 with an augmentation device;

FIG. 7 is a front elevational view of the embodiment shown in FIG. 6;

FIG. 8 is a side elevational view of the embodiment shown in FIG. 6;

FIG. 9 is a rear elevational view of the embodiment shown in FIG. 6;

DETAILED DESCRIPTION OF THE PREFERRED EMBODIMENT

Figure 1:
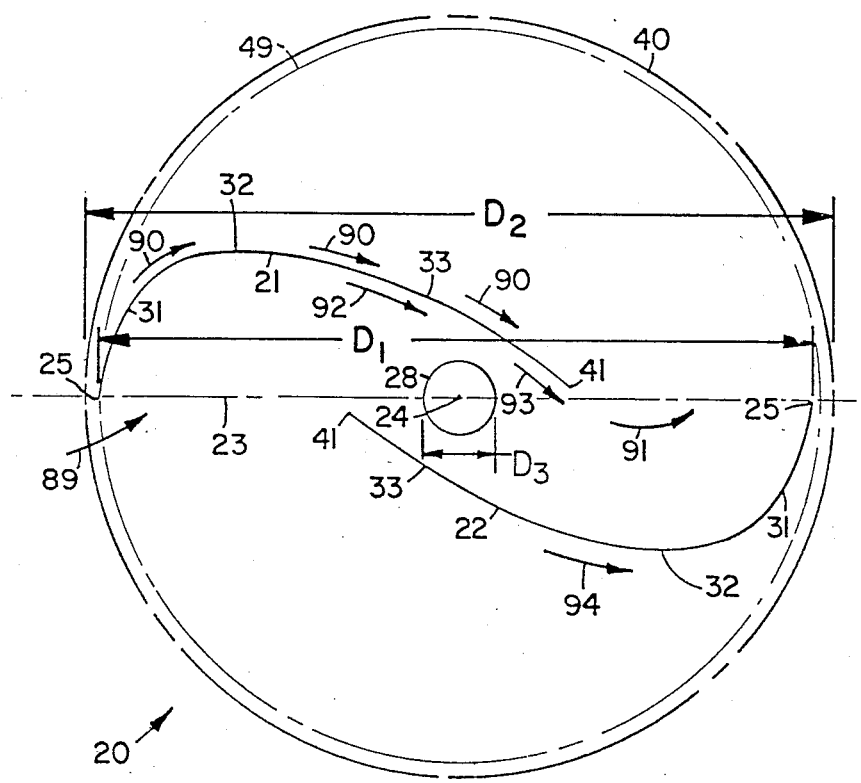
FIG. 1 is a diagrammatic view of a preferred embodiment of a two-blade Savonius-type rotor in accordance with the principals of the present invention.
Figure 2:
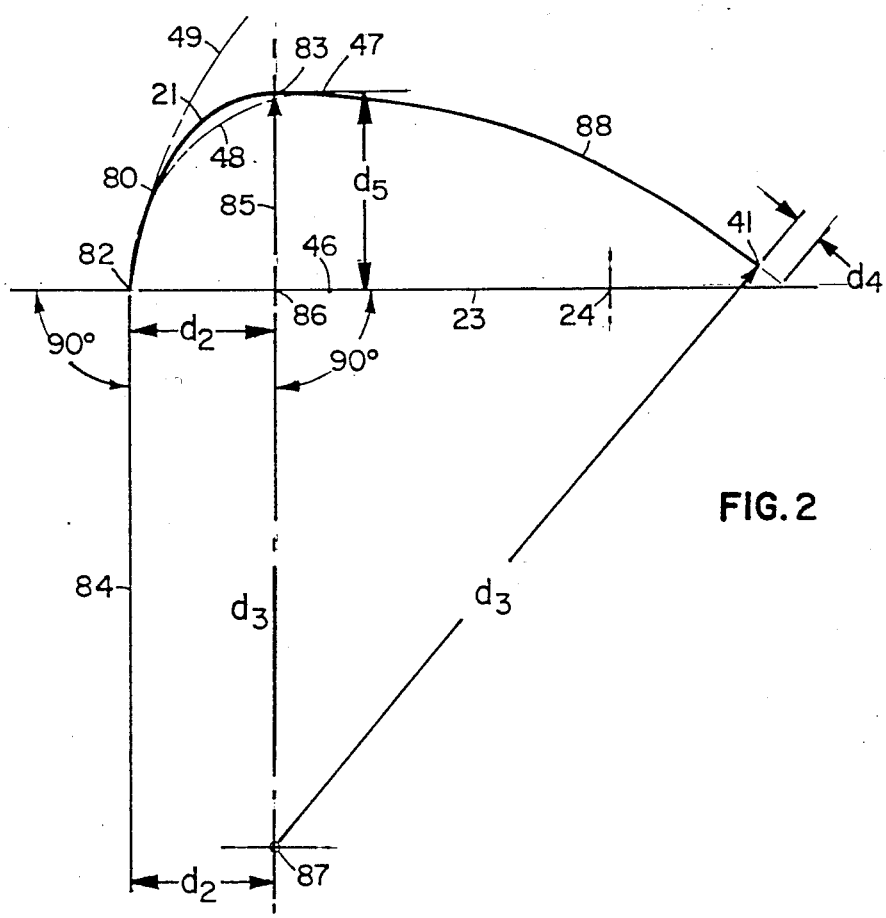
FIG. 2 is a diagrammatic view of a rotor blade of the embodiment shown in FIG. 1.

Referring now to the drawings, there is illustrated in FIGS. 1-2 a preferred embodiment of a two-blade Savonius-type rotor in accordance with the principles of the present invention This two-blade Savonius-type rotor is set out in applicant's U.S. Pat. No. 4,715,776 and U.S. patent application Ser. No. 069,405. The description of the rotor will be repeated here for convenience. The present invention includes two Savonius-type rotors 20, 120. The rotors of the present invention have a vertical axis of rotation, unlike the rotor in U.S. Pat. No. 4,715,776 which has a horizontal axis. Illustrated in FIGS. 6-10 is an embodiment of a rotor assembly including the two vertical axis Savonius-type rotors 20, 120 utilized with an embodiment of a deflector device 200 in accordance with the principles of the present invention, the rotor assembly being generally designated by the reference numeral 18. The rotor assembly 18 includes rotors 20, 120 mounted on support structure 210. In the preferred embodiment, rotors 20, 120 are identical so a description of rotor 20 should suffice as a description of rotor 120.

The rotor 20 includes two substantially identical blades 21, 22 as generally diagrammatically illustrated in FIG. 1. The blades 21, 22 are positioned for rotation about a central axis 24, which is substantially vertical in the embodiment shown. An imaginary plane 23 is shown passing through the vertical central axis 24 and outer blade tips 25. It will be appreciated that, as illustrated in FIG. 1, the blades 21, 22 are positioned much closer to the imaginary plane 23 than other Savonius-type rotor designs.

As illustrated in FIGS. 6-9, the preferred embodiment of rotor 20 of the present invention includes a circular end cap 26 at the top of rotor 20 and a similar circular end cap 27 at the bottom of rotor 20. The end caps 26, 27 are interconnected by blades 21, 22 which are disposed symmetrically about vertical central axis 24 and by a central shaft 28 to which to the blades 21, 22 are interconnected. Central shaft 28 may be either hollow or solid. It will be appreciated that rotor 20 may be arranged for rotation with respect to support arms 212, 214 at the top and bottom thereof in any suitable fashion. In the preferred embodiment, blades 21, 22 and central shaft member 28 are fastened together and the central shaft 28 is rotatably supported by bearings in the support arms 212, 214.

Figure 4:
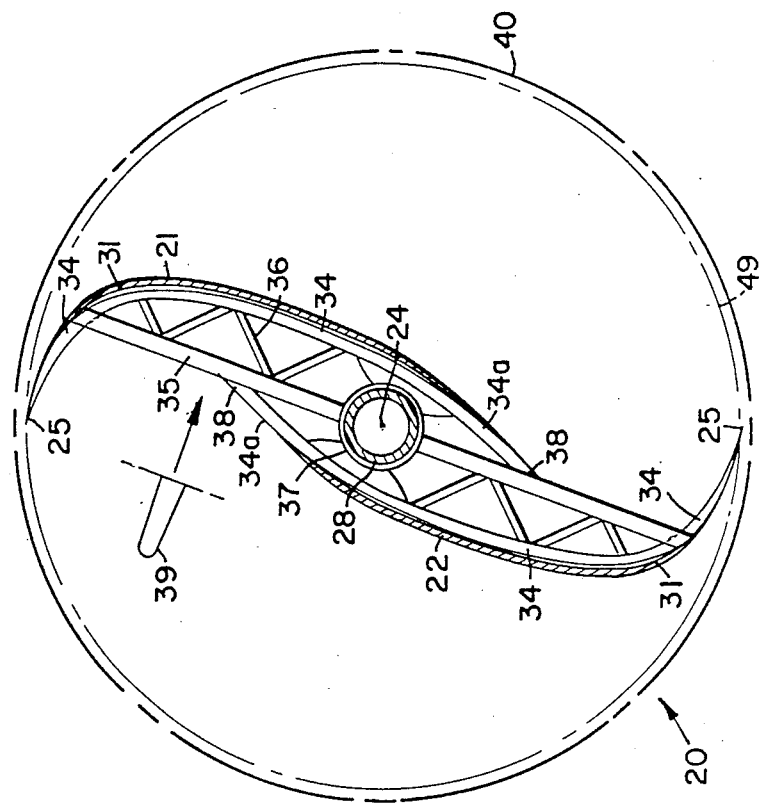
FIG. 4 is a cross-sectional view of the embodiment shown in FIG. 1 illustrating construction details.

As illustrated in FIGS. 1 and 4, each of tee blades 21, 22 has an outer edge or tip 25 which is preferably sharply pointed to provide better aerodynamic characteristics for the blades 21, 22 and an inner edge or tip 41 with respect to the central axis 24. The inner edge 41 is near the imaginary plane 23. Each of the blades 21, 22 has a curved portion 31 from the outer edge 25 to a point 32 generally in the direction of the inner edge 41 and a second curved portion 33 which is tangent to the first curved portion 31 at the location 32. The second curved portion 33 is an arc of a circle of relatively large radius in the preferred embodiment, although alternatively, the section can have a curve of varying radii from one end to the other and hence need not be the arc of a circle. The curves of blades 21, 22 define surfaces that are generally concave with respect to central axis 24.

The outer edge 25 of each blade 21, 22 lies on the circumference of a circle 49 with a diameter $D_1$ whose magnitude is variable since it is contemplated that rotor 20 may be constructed in various sizes. The circle 49 is centered on central axis 24 and defines the outer periphery of blades 21, 22. For purposes of this specification, measurements of the preferred embodiment will be expressed in terms of diameter $D_1$.

Figure 5:
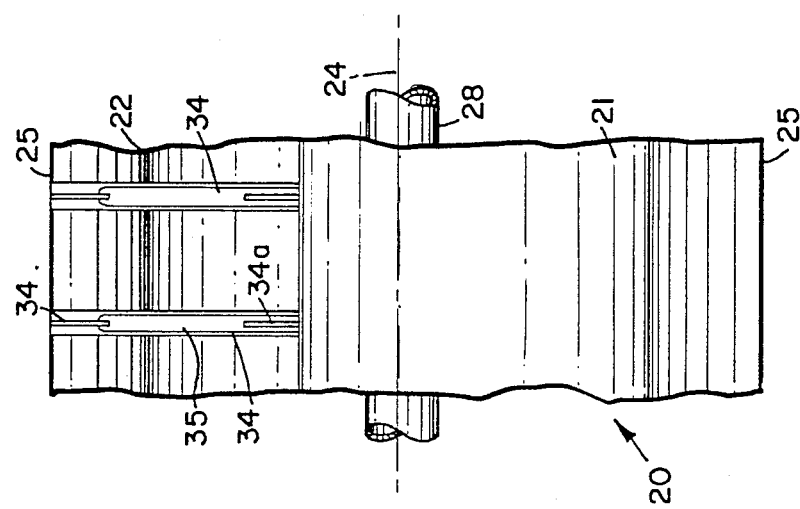
FIG. 5 is a partial elevational view of the rotor embodiment shown in FIG. 1, illustrating two sets of structural ribs and braces.

As illustrated in FIGS. 4 and 5, each of blades 21, 22 is reinforced by a plurality of ribs 34 spaced along shaft 28 between end caps 26, 27. Orientation of blades 21, 22 is maintained by a plurality of cooperating structural members 35, 36 and 37. Each of the ribs 34 consists of a lightweight structural section usually in the shape of a "T" which is fastened to structural member 35 usually in the shape of a hollow round section which, in turn, is fastened to the sleeve-like member 37 positioned over shaft 28 and extends radially from sleeve-like member 37 to near the outer edges 25 of blades 21, 22. Rigidity of the assembly is maintained by the diagonal structure members 36 interconnecting ribs 34 to structural member 35. Further strength is obtained by cutting the flanges from ribs 34 at blade edges 41 and extending each of the ribs 34 to a location 38 where they are fastened to corresponding structural member 35. This is illustrated in FIGS. 4 and 5 by reference numeral 34a, which designates such an extension of the ribs 34. Each of the sleeve-like members 37 are rigidly attached to shaft 28. While the above description is particularly suited for a relatively large turbine, it will be appreciated that various other designs are possible and that for very small rotors, a much simpler design would work. To further enhance performance a smooth, streamlined cover portion 39 might be placed over ribs 34 and their corresponding structural members 35 and 36.

As mentioned before, each of the blades 21, 22 is attached to end caps 26, 27. Each of the end caps 26, 27 has an outer periphery 40 as illustrated in FIGS. 1 and 4, which forms a circle having a diameter $D_2$ which in the preferred embodiment is $1.05D_1$. The circle 40 is centered about central axis 24.

More particularly, the geometric configuration of a preferred embodiment of blade 21, 22 will now be described, referring specifically to FIGS. 1, 2 and 4.

Curved portion 31 of each of the blades 21, 22 in cross-section forms a curve 80 as generally illustrated in FIG. 2, which extends from a point 82 at the outer edge 25 of each of the blades 21, 22 to a point 83 where the curved portion 31 is substantially tangent to the curved portion 33 which forms the curve 88 in FIG. 2. If the curved portion 88 or blade portion 33 is a straight line parallel to the plane 23, the location 32 or point 83 will be at the same location. However, if the blade portion 33 is at an angle directed toward the plane 23, the point of tangency will be slightly to the right of where it is now. The curved portion 31 represented by curve 80 in FIG. 2 is laid out in a similar manner to that described in U.S. Pat. No. 4,359,311 wherein the point of tangency 83 is closer to the circle 49 than that of a circular arc 48 which is tangent with the curve 88 at a point 47 and which is also tangent to the circle 49 at 82, the circular arc 48 having its center at a point 46 on the plane 23. However, it is different in that the dimensions are larger in relation to the diameter of the rotor, and the connecting curve 88 is tangent to the curve 80 at a slightly different point. The curved portion 80 has a progressively decreasing curvature toward the outer edge 25. At the outer edge, the radius of curvature is quite large. The radius of curvature gets progressively shorter and is shortest at the top of the curve. This is characteristic of an ellipse.

The maximum displacement of blades 21, 22 from the plane 23 is preferably less than $0.25D_1$ and most preferably $0.2D_1$ and it occurs at location 32 in FIG. 1 or point 83 in FIG. 2. If the inner edge 41 of the blade portion 33 were extended on a surface containing the inner edge 41 and the plane 23, the blade portion 33 will preferable cross the plane 23 at a location between $0.05D_1$ and $0.33D_1$ from axis 24. The inner edge 41 is preferably at a distance no greater than $0.1D_1$ from either side of the plane 23, measured perpendicular to the plane 23.

Figure 3:
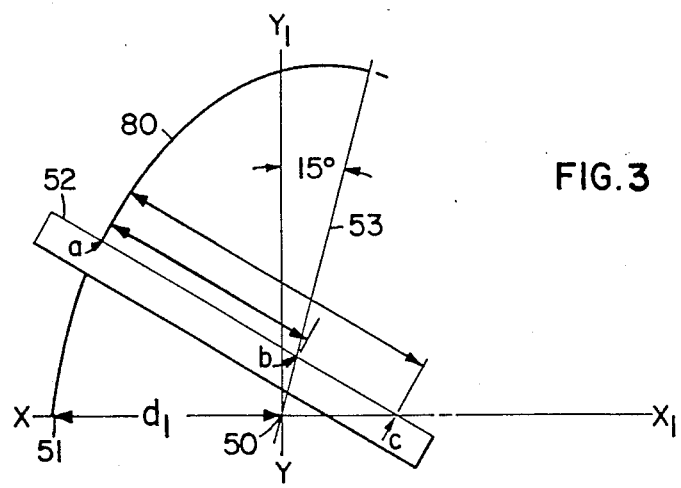
FIG. 3 illustrates a method for tracing the outer curved portion of the blades of the embodiment shown in FIG. 1.

As generally discussed in U.S. Pat. No. 4,359,311, hereby incorporated by reference, a pragmatic way of defining the profile of the curve 80 is illustrated in FIG. 3. Curve 80 is nearly one quadrant of a skewed ellipse whose major axis is one and one-half times its minor axis and whose major axis is on a 15 degree skew. The curve 80 is drawn by defining axis $X-X_1$ which is at right angles to an axis $Y-Y_1$ and which passes through central axis 24 of rotor 20. A point 50 and a point 51 are located on axis $X-X_1$ such that the point 50 is at a distance $d_1$ which in the preferred embodiment is $0.133D_1$ from point 51. Distance $d_1$ represents one-half the minor axis of a skewed ellipse. A straight edge 52 is marked with graduations a, b, and c such that the distance from a to b is $0.133D_1$ and the distance from a to c is $0.2D_1$ and which represents one-half the major axis of the skewed ellipse. A line 53 is drawn through the point 50 such that line 53 forms an angle of 15 degrees with the $Y-Y_1$ axis, which also extends through the point 50. Straight edge 52 is positioned and repositioned several times such that the graduation b remains on line 53 and the graduation c remains on the axis $X-X_1$ at all times. The resulting positions of a are plotted to give the ellipse curve 80 which may be described as a portion of a skewed ellipse which, in the horizontal cross-section, comprises the profile of the outer convex side of the curved portion 31 of blades 21, 22. Thus, location 32 in FIG. 1 or point 83 in FIG. 2 is fixed by its geometric relation to portion 31 and curve 80, respectively. If a straight line were constructed tangent to the curve at point 32, it would be parallel to plane 23. Referring to FIG. 3, by varying the length of the minor axis a-b in relation to the major axis a-c, and by changing the angle of the skew from 15 degrees, minor shifts in the point of tangency can be made.

From this description it will be appreciated that the shape of the outer curve 80 is similar to that of U.S. Pat. No. 4,359,311, except that the radius of the curvature of the outer curve 80 is larger with respect to rotor diameter $D_1$ and the point 83 of tangency to the curve 88 by the curve 80 is at a slightly different point than U.S. Pat. No. 4,359,311.

As illustrated in FIG. 2, the curve 88 which has its center at 87 is tangent to the curve 80 at the highest point of the curve 80 and the radius $d_3$ through points 83, 87 is at right angles to the plane 23 through the blade tip point 82 and the rotor center 24. Curve 88 extends to the point 41 where it terminates a distance $d_4$ along its arc of curvature of $0.025D_1$ from plane 23 which passes through points 82 and rotor center 24.

The distance $d_2$ from the point 82 located on vertical line 84 to point 86 located on radius line 85 is $d_2$ equals $0.151D_1$. Although shaft 28 preferably has a diameter of $D_3$ equals $0.1D_1$, there is plenty of room left for an even larger sized shaft, if so desired. Applicant's tests have shown that a similar rotor showed no appreciable loss in efficiency due to constriction of the wind passage through the rotor blades 21, 22 and the size of shaft 28. However, applicant has noticed that if the air passage in the vicinity of shaft 28 is completely blocked, there is a significant drop in efficiency.

Rotor blades 21, 22 and shaft 28 of rotor 20 should be smooth. All rotor blade measurements are to the convex surfaces of rotor blades 21, 22. The maximum depth $d_5$ of curve 88 is preferably $0.2D_1$.

From an overall design standpoint, rotor blades 21, 22 of the prefered embodiment have a shape which permits economical and easy bracing by ribs and fastening to central shaft 28.

By way of illustration, measurements for a preferred embodiment of rotor 20 and rotor assembly 18 are provided below, all measurements being given in terms of $D_1$ of rotor 20 which is the diameter of the circle defined by the outer edges 25 of rotor blades 21, 22:

| | |
|---|---|
| $D1 = D_1$ | $d_5 = 0.2D_1$ |
| $D_2 = 1.05D_1$ | $d_6 = 0.9D_1$ |
| $D_3 = 0.1D_1$ | $d_7 = 0.9D_1$ |
| $D_4 = 1.25D_1$ | $d_8 = 2.25D_1$ |
| $D_5 = 1.8D_1$ | $d_9 = 0.575D_1$ |
| $d_1 = 0.133D_1$ | $d_{10} = 1.35D_1$ |
| $d_2 = 0.151D_1$ | $d_{11} = 0.575D_1$ |
| $d_3 = 0.775D_1$ | $d_{12} = 0.5D_1$ |
| $d_4 = 0.025D_1$ | $d_{13} = 1.55D_1$ |

Although the design for the blade tip in the preferred embodiment is nearly identical to that described in U.S. Pat. No. 4,359,311, the blade tip section of the rotor can be either larger or smaller in relation to the rotor diameter. Further, although the connecting curve 88 toward the rotor center is a curve of radius $d_3 = 0.775D_1$ with its concave side facing rotor axis 24, the curve can be of any radius that will trace an arc of a circle, which if extended, would cross the plane 23 illustrated in FIG. 1. Also, curve 88 can have various radii, providing each section of the curve is concave on a side facing the rotor axis 24 and the end of the curve crosses plane 23. The curve from the general area of point 83 toward the rotor center can also be a substantially straight line. The line can be parallel to the plane 23 or it can be at an angle so as to cross plane 23. The location of inside edge 41 of blades 21, 22 in the preferred embodiment, as illustrated in FIG. 2, is the optimum location for the particular geometric design shown. However, it will be appreciated that if any of the other configurations are selected for curve 88, inner edge 41 might be located at other positions. If the equivalent of curve 88 is a straight line, curve 80 should be extended in the area 83 to a new point of tangency with a straight line.

The operation of rotor 20 of the present invention as the applicant understands it will now be described with particular reference to FIG. 1. As mentioned before, rotor 120 is nearly identical to rotor 20. The difference between rotor 120 and rotor 20 being that when viewed from the top, as in FIG. 6, rotor blades 21, 22 of rotor 20 are configured for rotation in a clockwise direction while blades 121, 122 of rotor 20 are configured for rotation in a counter-clockwise direction. Therefore, a description of the operation of rotor 20 also describes the operation of rotor 120 except that rotor blades 121, 122 will rotate in the opposite direction of rotor blades 21, 22.

Referring now to FIG. 1, wind travelling in a direction 89 relative to rotor 20 enters rotor 20 and follows paths 90, 91, 92 and 94 through the rotor. Wind following the path 90 over the convex side of the curves 31, 33 creates a suction which creates a pulling force on blade 21, while wind following path 92 creates a pushing force on blade 21. Wind escapes along paths 93 and 91. Wind following path 94 along the convex side of blade 22 exerts a pushing force which has a slowing effect on rotor 20. This is minimized to some extent by the fact that as the wind follows the curve of blade 22 there is a small centrifugal wind force acting counter to the direct push of the wind. This centrifugal force is maximum at the point of sharpest curvature. The net effect of all the forces is a strong clockwise motion of the rotor. Referring back to the wind action on blade 21, as the rotor turns while the wind moves forward along blade 21, the rotor changes direction of tee air, tending to drag it toward the center of the rotor. The wind naturally resists a change in its direction, thus exerting a suction on the rotor blade in the direction of rotation. If blade 21 is too long, that same section will have an effect of slowing down the rotor. It therefore follows that the rotor will operate quite efficiently if section 33 of the rotor blade were straight providing the section made a favorable angle with plane 23, and the cutoff point 41 were at the right location. Similarly, blade section 33 could be on a curve of different radius than curve 88, as shown, although it is believed that the curvature shown in FIG. 2 gives better efficiency than any other configuration.

Illustrated in FIGS. 6–10 is a rotor assembly 18 including rotors 20 and 120, each of which embodies the principles of the Savonius-type rotor of the present invention. As illustrated in FIGS. 6–10, rotors 20, 120 are mounted with their axes vertical. Rotors 20, 120 might be any Savonius-type rotor but the preferred embodiment is either a three-blade or two-blade rotor, and the most preferred embodiment is a two-blade rotor, as previously described. The three-blade rotor of U.S. Pat. No. 4,359,311 is less efficient than the two-blade rotor herein described, but it exhibits somewhat smoother power. However, the two-blade rotor is selected in the preferred embodiment herein because of its greater efficiency. When the twin two-blade rotors 20, 120 are used with a vertical augmenting deflector device 200 in front, their action is greatly improved to the point that vibration inherent in the two-blade design is no longer an important consideration. Moreover, the power output is increased. Also, the two-blade rotor will self-start at full load, regardless of the static orientation of the rotor blades. The height $D_4$ of rotors 20, 120 in the preferred embodiment is $D_4 = 1.25 D_1$.

Rotor shafts 28, 128 are held in place by support arms 212 and 214. Support arm 212 supports the top of rotor shafts 28, 128 and support arm 214 supports the bottoms of rotor shafts 28 and 128. Support arms 212, 214 contain bearings in each of their ends such that central shafts 28, 128 are free to rotate with respect to support arms 212, 214. Support arms 212, 214 are strengthened by diagonal structural members 216, 218, respectively. Only members 216 are shown in the drawings. In the preferred embodiment, support arms 212, 214 are disposed horizontally so that rotors 20, 120 are supported at the same horizontal level. Support arms 212, 214 are each connected at their centers to a vertical tube 220. Vertical tube 220 extends beyond the top of rotors 20, 120. In the preferred embodiment, support arms 212, 214 have a length such that the horizontal distance between vertical axis 24 of rotor 20 and vertical axis 124 of rotor 120 is $D_5 = 1.8 D_1$. Also, since the centers of support arm 212, 214 are connected to vertical tube 220, the horizontal distance $d_6$ between vertical axis 24 of rotor 20 and the center of vertical tube 220 is equal to the horizontal distance $d_7$ between vertical axis 124 of rotor 20 and the center of vertical tube 220, so that $d_6 = d_7 = 0.9 D_1$. Diagonal support arms 222, 224 also help support rotors 20, 120. Diagonal support arms 222 are connected at one end to support arm 212 near rotor shaft 128 and are connected at the other end to vertical tube 220 near the top of the tube 220. Diagonal support arms 224 are connected at one end to support arm 212 near rotor shaft 28 and are connected at the other end to vertical tube 220 near the top of vertical tube 220.

Alternators 60, 62 are located on the bottoms of rotor shafts 28, 128, respectively. Thus, the alternators are easily accessible and can be conveniently serviced and maintained.

The design for the vertical augmenting deflector plate 200 as shown in FIGS. 6–10 is based on the requirements for large rotors. The deflector plate 200 is shown as lying in a vertical plane displaced from and parallel to a vertical plane containing the vertical axes 24 and 124 on the windward side of the rotors 20 and 120. The surface facing the wind is preferably covered by a thin layer of aluminum for smoothness. Deflector plate 200 is reinforced by a plurality of ribs 226 which run horizontally across plate 200. Vertical braces 228, 230 further support deflector plate 200. Ribs 226 and braces 228, 230 are attached to the side of deflector plate 200 which faces rotors 20, 120.

Deflector plate 200 is rigidly attached to support structure 210. Horizontal arms 232, 234 are connected at one end to vertical braces 228, 230, respectively, near their tops. The other ends of horizontal arms 232, 234 are connected to support arm 212. Horizontal arms 233, 235 are connected at one end to vertical braces 228, 230, respectively, near their bottoms. The other end of horizontal arms 233, 235 are connected to support arm 214.

In the preferred embodiment, a vertical partition plate 236 is also provided to give rigidity to deflector plate 200. Partition plate 236 is connected at one end to the side of deflector plate 200 which faces rotors 20, 120 between vertical braces 228, 230. Partition plate 236 is connected to vertical tube 220 and has a height which is slightly taller than the height of rotors 20, 120 and equal to the vertical distance between support arms 212, 214. Partition plate 236, in the preferred embodiment, is perpendicular to support arms 212, 214. The length of partition plate 236 is slightly greater than the diameter of rotors 20, 120. Partition plate 236 is extended by a short tail section 238 which extends from the end of partition plate 236 that is not connected to deflector plate 200. Tail section 238 is thinner than partition plate 236 but it is the same height as partition plate 236. As shown in FIG. 6, diagonal braces 240 connect partition plate 236 to support arm 212. Similar braces 241 connect the bottom of partition plate 236 to support arm 214.

As shown in FIG. 9, support structure 210 is mounted for rotation about central vertical shaft 242. Thus, rotors 20, 120, deflector plate 200 and partition plate 236 all rotate about central vertical shaft 242 in fixed relationship to one another since they are all rigidly connected to support structure 210. The rotation of support structure 210 about central vertical shaft 242 can be controlled by a wind sensor nearby (not shown). The wind sensor would activate a mechanism in the rotor assembly (not shown) that would slowly turn the support structure 210 in the correct direction so as to face the twin rotor assembly into the wind. Also, tail section 238 on partition plate 236 will assist this wind sensor control system in orienting the rotor assembly in the correct direction. Central vertical shaft 242 extends to the ground and is firmly anchored there. Legs 244 extending from central vertical shaft 242 to the ground also provide support for the rotor assembly.

Figure 10:
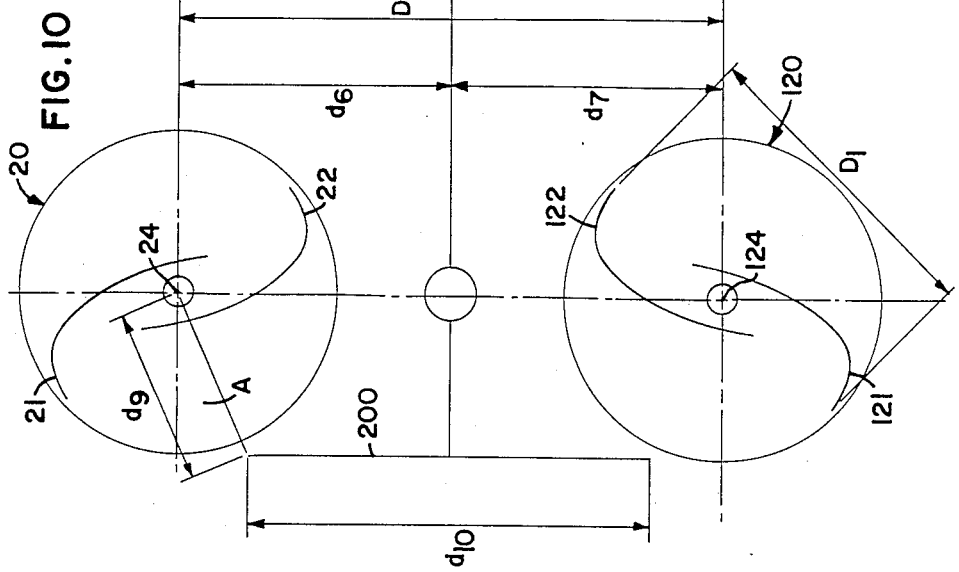
FIG. 10 is a top diagrammatic view of the embodiment shown in FIG. 6.

In the preferred embodiment, deflector plate 200 is a vertical flat plate and preferably extends beyond the top and the bottom of rotors 20, 120 so that the total height $d_8$ of deflector plate 200 is $d_8 = 2.25 d_1$. The width of deflector plate 200 and the location of deflector plate 200 with respect to central vertical axes 24 and 124 is critical. The horizontal distance $d_9$ between the edge of deflector plate 200 closest to central vertical axis 24 and central vertical axis 24 is $d_9 = 0.575 D_1$ in the preferred embodiment as shown in FIG. 10. The angle A between a horizontal line drawn through central vertical axis 24 of rotor 20 and the edge of deflector plate 200 which is closest to axis 24 and another horizontal line drawn through central vertical axis 24 perpendicular to a line drawn through vertical axes 24, 124 is $A = 23°$ in the preferred embodiment. The relationship between the edge of deflector plate 200 which is closest to central vertical axis 124 and central vertical axis 124 is identical to that just described, in the preferred embodiment. Thus, in the preferred embodiment, deflector plate 200 is centered between central vertical axes 24, 124 and the resulting width $d_{10}$ of deflector plate 200 is $d_{10} = 1.35 D_1$. From testing a small model of a single rotor and a deflector at a low wind speed, the applicant has figured that if the distance between rotor centers is unchanged, and if the width of deflector plate 200 is increased, the power drops off sharply. If the width of deflector plate 200 is decreased, the power drops off more slowly. The change in power is due primarily to the resulting change in angle A in FIG. 10. A reasonably large model should be tested at normally expected wind speeds to arrive at the optimum distance for deflector plate 200, and the angle A as shown in FIG. 10.

Figure 11:
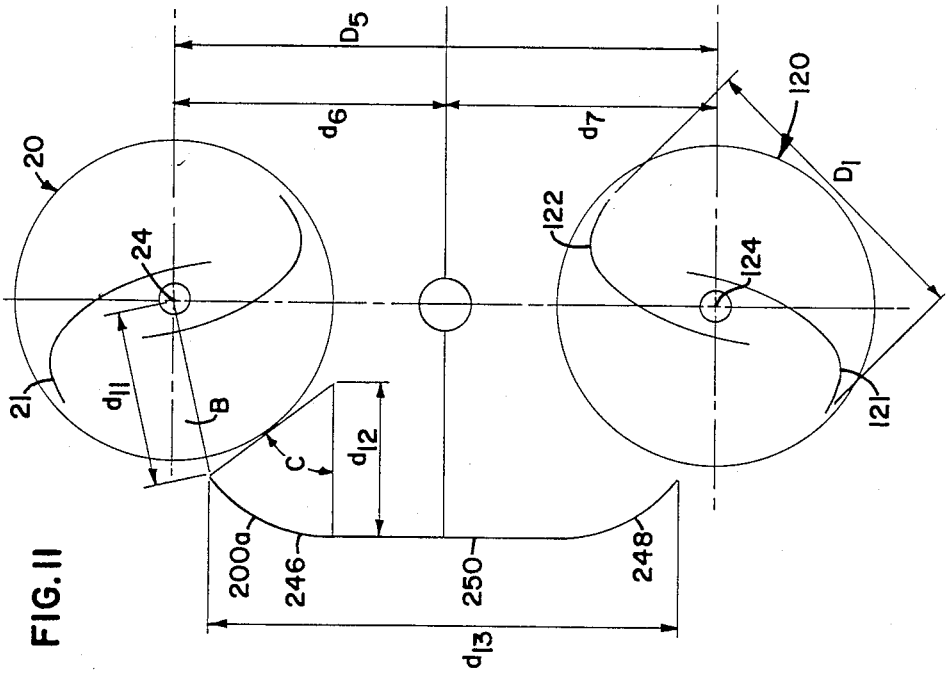
FIG. 11 is a top diagrammatic view of an embodiment of two vertical Savonius-type rotors similar to that of FIG. 1 with an alternative embodiment of an augmentation device.

An alternative embodiment of the deflector plate is shown in FIG. 11. Deflector plate 200a shown in this embodiment has a curved portion 246 closest to vertical axis 24, another curved portion 248 closest to central vertical axis 124 and a flat portion 250 in between the two curved portions. In this embodiment, the horizontal distance $d_{11}$ between the edge of curved portion 246 closest to central vertical axis 24 and central vertical axis 24 is $d_{11} = 0.575 D_1$. The angle B that a horizontal line drawn through central vertical axis 24 of rotor and the edge of deflector plate 200a which is closest to axis 24 and another horizontal line drawn through central vertical axis 24 perpendicular to a line drawn through vertical axes 24, 124 is $B = 12.6°$ in this embodiment. The radius $d_{12}$ of curved portion 246 is $d_{12} = 0.5 D_1$ and the central angle C from the top of the curved portion 246 to a horizontal line is $C = 53°$. The relationship of curved portion 248 to central vertical axis 124 is the same as the relationship between curved portion 246 and central vertical axis 24. The width $d_{13}$ of deflector plate 200a is $d_{13} = 1.55 D_1$.

The operation of the present invention will now be described with particular reference to FIGS. 6–9. With deflector plate 200 in place, rotors 20, 120 are able to self-start under a full load. The wind control assembly will rotate support structure 210 about central vertical shaft 242 so that the width of deflector plate 200 is perpendicular to the direction of the wind. Wind following path 140 enters rotors 20, 120 and causes them to spin in a clockwise and counterclockwise direction, respectively. Partition plate 236 prevents wind leaving each rotor from reacting with the other rotor and creating turbulence with a possible reduction in efficiency. Central shafts 28, 128 rotate in bearings and support arms 212, 214. The rotation of central shafts 28, 128 is translated into electrical energy by alternators 60, 62, respectively.

It should be noted that once the wind control assembly has oriented support structure 210 such that deflector plate 200 is perpendicular to the direction of the wind, there will be only a minor, if any, moment in yaw so that the yaw control mechanism need exert only a minor torque to keep the rotors properly oriented in the wind. This balance in yaw results from the symmetry of rotors assembly 18.

There are many possible variations of the preferred embodiment described above. The principal variation would be in the location of the axis of rotation in yaw. In alternative embodiments, central vertical shaft 242 could be moved forward so that it is located closer to the back of deflector plate 200 or in front of deflector plate 200. In another alternative embodiment, central vertical shaft 242 could be located at the front edge of deflector plate 200 so that the deflector is split into two wings that extend to the right and left of central vertical shaft 242.

Although moving central vertical shaft 242 forward, as described above in the alternative embodiments, will improve the control in yaw, it is not believed that control simply by wind action alone will be stable enough to allow for the omission of a separate yaw control mechanism. If central vertical shaft 242 is moved forward as described above, a stronger central vertical shaft 242 will be needed because of the eccentric loading due to the weight of the turbine mechanism, in addition to the force of the wind.

In yet another alternative embodiment, central vertical shaft 242 can be moved so far forward of the location of deflector plate 200 in the preferred embodiment that wind force alone would keep the system correctly oriented with respect to the wind direction. In this alternative embodiment, a set of wheels may be necessary, operating on a track on the ground with a short radius from the center of central vertal shaft 242 to the track. Also in this alternative embodiment, the airfoil/airguide described in applicant's U.S. Pat. No. 4,715,776 would be very effective for controlling in yaw in addition to controlling the speed of the rotors. In adapting the airfoil/airguide of U.S. Pat. No. 4,715,776 to this alternative embodiment, there would be two airfoil/airguides, one for each rotor, and there would have to be a mechanism to coordinate the angle that the guides make with the wind so that the angle that one airfoil/airguide makes with a plane through the axis of the rotor support mechanism at right angles to a line through the rotor centers is always the same as the angle that the other airfoil/airguide makes with the plane.

It should also be noted that the airfoil/airguide described in U.S. Pat. No. 4,715,776 can be used to control the system described herein as well as the single rotor system described in U.S. Pat. No. 4,715,776.

Thus, an efficient rotor assembly including twin vertical axis Savonius-type rotors is provided. The assembly includes one deflector device to increase the power output of both rotors. The present invention provides for a wide deflector plate augmenting two rotors so that the wind deflected off both edges of the deflector plate is utilized. The rotor assembly is balanced in yaw so only a minor torque is needed to keep the assembly properly oriented in the wind.

It is to be understood that even though numerous characteristics and advantages of the invention have been set forth in the foregoing description, together with details of the structure and function of the invention, the disclosure is illustrative only and changes may be made in detail, especially in matters of shape, size and arrangement of parts within the principles of the invention, to the full extent indicated by the broad general meaning of the terms in which the appended claims are expressed.

What is claimed is:

1. A Savonius rotor assembly for interacting with a moving fluid, comprising:
    a support framework;
    a first rotor rotatably mounted on the support framework for rotation about a first central, vertically extending axis, the first rotor having a shaft, a top, a bottom, a height and at least two blades, each blade having an inner and an outer edge with respect to the first central, vertically extending axis, the blades positioned to allow fluid flow between the inner edges thereof;
    a second rotor rotatably mounted on the support framework for rotation about a second central, vertically extending axis, the second rotor having a shaft, a top, a bottom, a height and at least two blades, each blade having an inner and an outer edge with respect to the second central, vertically extending axis, the blades positioned to allow fluid flow between the inner edges thereof, the second rotor being positioned at substantially the same horizontal level as the first rotor;
    a deflector member, extending substantially along the heights of the first and second rotors and positioned on a side of the first and second rotors facing the direction from which the fluid is flowing, the deflector member including a substantially planar surface facing the direction from which the fluid is flowing, the deflector member having a width less than the horizontal distance between the first central, vertically extending axis and the second central, vertically extending axis and being centered between a first plane extending through the first central, vertically extending axis of the first rotor substantially perpendicular to a line drawn through the first and second central, vertically extending axes and a plane drawn through the second central, vertically extending axis of the second rotor substantially perpendicular to the line drawn through the first and second central, vertically extending axes.

2. A Savonius rotor assembly in accordance with claim 1, wherein the height of the second rotor is substantially equal to the height of the first rotor.

3. A Savonius rotor assembly in accordance with claim 1, wherein the blades of the first rotor and the blades of the second rotor are configured so that the first rotor rotates in the opposite direction as the second rotor rotates.

4. A Savonius rotor assembly in accordance with claim 1, wherein the deflector member extends beyond the tops and bottoms of the first and second rotors.

5. A Savonius rotor assembly in accordance with claim 1, wherein the deflector member is substantially parallel to a plane drawn through the first and second central, vertically extending axes.

6. A Savonius rotor assembly in accordance with claim 1, wherein the deflector member has a first edge which is closest to the plane extending through the first central, vertically extending axis and a second edge which is closest to the plane extending through the second central, vertically extending axis nd includes a first curved portion, a second curved portion and a straight portion, the first curved portion extending from the first edge to the straight portion and defining a surface generally concave with respect to the first central, vertically extending axis, the second curved portion extending from the second edge to the straight portion and defining a surface generally concave with respect to the second central, vertically extending axis.

7. A Savonius rotor assembly in accordance with claim 6, wherein the straight portion of the deflector member is substantially parallel to a plane drawn through the first and second central, vertically extending axes.

8. A Savonius rotor assembly in accordance with claim 1, further comprising:
    a rigid partition interconnected to the deflector member and the support framework, the partition extending substantially along the heights of the first and second rotors and positioned intermediate the first and second rotors, the partition plate extending from the deflector member in the direction of fluid flow substantially perpendicular to a line drawn through the first and second central, vertically extending axes.

9. A Savonius rotor assembly in accordance with claim 1, wherein the support framework is rotatably mounted for rotation about a third substantially vertical axis.

10. A Savonius rotor assembly in accordance with claim 9, wherein the support framework is supported for rotation about the third substantially vertical axis by central vertical shaft means.

11. A Savonius rotor assembly in accordance with claim 1, wherein the shaft of the first rotor extends beyond the top and beyond the bottom of the first rotor and the shaft of the second rotor extends beyond the top and beyond the bottom of the second rotor.

12. A Savonius rotor assembly in accordance with claim 11, wherein the support framework includes:
    a substantially vertical tube;
    first arm means for connecting the top of the shaft of the first rotor and the top of the shaft of the second rotor to the tube; and
    second arm means for connecting the bottom of the shaft of the first rotor and the bottom of the shaft of the second rotor to the tube.

13. A Savonius rotor assembly in accordance with claim 12, wherein the vertical tube is positioned equidistance from the first central, vertically extending axis and the second central, vertically extending axis.

14. A Savonius rotor assembly in accordance with claim 12, wherein the vertical tube is centered on a line drawn through the first central, vertically extending axis and the second central, vertically extending axis.

15. A Savonius rotor assembly for interacting with a moving fluid, comprising:
a support framework;
a first rotor rotatably mounted on the support framework for rotation about a first central, vertically extending axis, the first rotor having two blades disposed symmetrically about the first central, vertically extending axis, each of the blades having an outer edge and an inner edge with respect to the first central, vertically extending axis, the outer edges of the blades lying on a circle defining a diameter of the first rotor, the blades further having a first curved portion and a second curved portion, the first curved portion beginning at the outer edge and terminating at the second curved portion with the first curved portion defining a surface generally concave with respect to the first central, vertically extending axis, the first curved portion having a radius of curvature which becomes progressively less from the outer edge to the second curved portion, the second curved portion coming progressively closer to a plane containing the first central, vertically extending axis and the outer edge of the blade as the second curved portion extends from the first curved portion to the inner edge of the blade, the maximum displacement of the blades from the plane being less than one quarter of the diameter of the first rotor;
a second rotor rotatably mounted on the support framework for rotation about a second central, vertically extending axis the second rotor being positioned at substantially the same horizontal level as the first rotor, the second rotor having two blades disposed symmetrically about the second central, vertically extending axis, each of the blades having an outer edge and an inner edge with respect to the second central, vertically extending axis, the outer edges of the blades lying on a circle defining a diameter of the second rotor, the blades further having a first curved portion and a second curved portion, the first curved portion beginning at the outer edge and terminating at the second curved portion with the first curved portion defining a surface generally concave with respect to the second central, vertically extending axis, the first curved portion having a radius of curvature which becomes progressively less from the outer edge to the second curved portion, the second curved portion coming progressively closer to a plane containing the second central, vertically extending axis and the outer edge of the blade as the second curved portion extends from the first curved portion to the inner edge of the blade, the maximum displacement of the blades from the plane being less than one quarter of the diameter of the second rotor; and
a deflector member having a width and extending substantially along the heights of the first and second rotors and positioned on the side of the first and second rotors facing the direction from which the fluid is flowing.

16. A Savonius rotor assembly in accordance with claim 15, wherein the deflector member has a width less than the horizontal distance between the first central, vertically extending axis and the second central, vertically extending axis and is centered between a first plane extending through the first central, vertically extending axis of the first rotor substantially perpendicular to a line drawn through the first and second central, vertically extending axes and a plane drawn through the second central, vertically extending axis of the second rotor substantially perpendicular to the line drawn through the first and second central, vertically extending axes.

17. A Savonius rotor assembly for interacting with a moving fluid, comprising:
a support framework;
a first rotor rotatably mounted on the support framework for rotation about a first central, vertically extending axis, the first rotor having a shaft, a top, a bottom, a height and at least two blades, each blade having an inner and an outer edge with respect to the first central, vertically extending axis, the blades positioned to allow fluid flow between the inner edges thereof;
a second rotor rotatably mounted on the support framework for rotation about a second central, vertically extending axis, the second rotor having a shaft, a top, a bottom, a height and at least two blades, each blade having an inner and an outer edge with respect to the second central, vertically extending axis, the blades positioned to allow fluid flow between the inner edges thereof, the blades of the first rotor and the blades of the second rotor configured so that the first rotor rotates in the opposite direction as the second rotor rotates, the second rotor being positioned at substantially the same horizontal level as the first rotor;
a deflector member extending substantially along the heights of the first and second rotors and positioned on the side of the first and second rotors facing the direction from which the fluid is flowing, the deflector member having a width less than the horizontal distance between the first central, vertically extending axis and the second central, vertically extending axis and being centered between a first plane extending through the first central, vertically extending axis of the first rotor substantially perpendicular to a line drawn through the first and second central, vertically extending axes and a plane drawn through the second central, vertically extending axis of the second rotor substantially perpendicular to the line drawn through the first and second central, vertically extending axes, the deflector member further being substantially parallel to a plane drawn through the first and second central, vertically extending axes.

18. A Savonius rotor assembly in accordance with claim 17, wherein the height of the second rotor is substantially equal to the height of the first rotor.

19. A Savonius rotor assembly in accordance with claim 17, wherein the deflector member extends beyond the tops and bottoms of the first and second rotors.

20. A Savonius rotor assembly in accordance with claim 17, wherein the deflector member includes a substantially planar face facing the direction from which the fluid is flowing.

21. A Savonius rotor assembly in accordance with claim 17, wherein the deflector member has a first edge which is closest to the plane extending through the first central, vertically extending axis and a second edge which is closest to the plane extending through the second central, vertically extending axis and includes a first curved portion, a second curved portion and a straight portion, the first curved portion extending from the first edge to the straight portion and defining a surface generally concave with respect to the first central, vertically extending axis, the second curved portion extending from the second edge to the straight portion and defining a surface generally concave with respect to the second, central vertically extending axis, the straight portion being substantially parallel to a plane drawn through the first and second central, vertically extending axes.

22. A Savonius rotor assembly in accordance with claim 17, wherein the first rotor has two blades disposed symmetrically about the first central, vertically extending axis, the outer edges of the blades lying on a circle defining a diameter of the first rotor, the blades further having a first curved portion and a second curved portion, the first curved portion beginning at the outer edge and terminating at the second curved portion with the first curved portion defining a surface generally concave with respect to the first central, vertically extending axis, the first curved portion having a radius of curvature which becomes progressively less from the outer edge to the second curved portion, the second curved portion coming progressively closer to a plane containing the first, central vertically extending axis and the outer edge of the blade as the second curved portion extends from the first curved portion to the inner edge of the blade, the maximum displacement of the blades from the plane being less than one-quarter of the diameter of the first rotor; and wherein the second rotor has two blades disposed symmetrically about the second central, vertically extending axis, the outer edges of the blades lying on a circle defining a diameter of the second rotor, the blades further having a first curved portion and a second curved portion, the first curved portion beginning at the outer edge and terminating at the second curved portion with the first curved portion defining a surface generally concave with respect to the second central, vertically extending axis, the first curved portion having a radius of curvature which becomes progressively less from the outer edge to the second curved portion, the second curved portion coming progressively closer to a plane containing the second central, vertically extending axis and the outer edge of the blade as the second curved portion extends from the first curved portion to the inner edge of the blade, the maximum displacement of the blades from the plane being less than one-quarter of the diameter of the second rotor.

23. A Savonius rotor assembly for interacting with a moving fluid, comprising:

a support framework;

a first rotor rotatably mounted on the support framework for rotation about a first central, vertically extending axis, the first rotor having a shaft, a top, a bottom, a height and at least two blades, each blade having an inner and an outer edge with respect to the first central, vertically extending axis, the blades positioned to allow fluid flow between the inner edges thereof;

a second rotor rotatably mounted on the support framework for rotation about a second central, vertically extending axis, the second rotor having a shaft, a top, a bottom, a height and at least two blades, each blade having an inner and an outer edge with respect to the second central, vertically extending axis, the blades positioned to allow fluid flow between the inner edges thereof, the blades of the first rotor and the blades of the second rotor configured so that the first rotor rotates in the opposite direction as the second rotor rotates, the second rotor being positioned at substantially the same horizontal level as the first rotor;

a deflector member extending substantially along the heights of the first and second rotors and positioned on the side of the first and second rotors facing the direction from which the fluid is flowing, the deflector member having a width less then the horizontal distance between the first central, vertically extending axis and the second central, vertically extending axis and being positioned so that a line drawn anywhere along the height of the surface of the deflector member facing the direction from which the fluid is flowing is a substantially vertical line, the deflector member further being symmetrical about a plane centered between the first and second central, vertically extending axes perpendicular to a plane drawn through the first and second central, vertically extending axes.

* * * * *

UNITED STATES PATENT AND TRADEMARK OFFICE
CERTIFICATE OF CORRECTION

PATENT NO. : 4,830,570
DATED : May 16, 1989
INVENTOR(S) : Alvin H. Benesh

It is certified that error appears in the above-identified patent and that said Letters Patent is hereby corrected as shown below:

In column 1, line 31, "propeller type" should be --propeller-type--.

In column 1, line 48, "4,7815,776" should be --4,715,776--.

In column 2, line 6, after "4,715,776" insert --and--.

In column 2, line 23, "ustype" should be --us-type--.

In column 2, line 55, "Savoniustype" should be --Savonius-type--.

In column 3, line 19, "Savoniss" should be --Savonius--.

In column 4, line 29, "in" (2nd) should be --is--.

UNITED STATES PATENT AND TRADEMARK OFFICE
CERTIFICATE OF CORRECTION

PATENT NO. : 4,830,570
DATED : May 16, 1989
INVENTOR(S) : Alvin H. Benesh

It is certified that error appears in the above-identified patent and that said Letters Patent is hereby corrected as shown below:

In column 5, line 49, delete --to-- (2nd).

In column 5, line 58, "tee" should be --the--.

In column 7, line 15, "preferable" should be --preferably--.

In column 8, line 19, "prefered" should be --preferred--.

In column 9, line 24, "tee" should be --the--.

In column 12, line 3, "d13" should be --$d_{13}$--.

In column 12, line 57, "vertal" should be --vertical--.

UNITED STATES PATENT AND TRADEMARK OFFICE
CERTIFICATE OF CORRECTION

PATENT NO. : 4,830,570

DATED : May 16, 1989

INVENTOR(S) : Alvin H. Benesh

It is certified that error appears in the above-identified patent and that said Letters Patent is hereby corrected as shown below:

In column 14, line 21, "nd" should be --and--.

In column 15, line 2-3 "equidistance" should be --equidistant--.

In column 18, line 37, "then" should be --than--.

Signed and Sealed this

Thirteenth Day of March, 1990

Attest:

*Attesting Officer*

JEFFREY M. SAMUELS

*Acting Commissioner of Patents and Trademarks*